April 30, 1968   S. J. MARKOWSKI   3,380,660
VARIABLE AREA EXHAUST DEFLECTOR

Filed April 28, 1966   2 Sheets-Sheet 1

INVENTOR.
STANLEY J. MARKOWSKI
BY *Fishman & Van Kirk*

ATTORNEYS.

April 30, 1968    S. J. MARKOWSKI    3,380,660
VARIABLE AREA EXHAUST DEFLECTOR
Filed April 28, 1966    2 Sheets-Sheet 2

INVENTOR.
STANLEY J. MARKOWSKI
BY Fishman & Van Kirk

ATTORNEYS.

United States Patent Office 3,380,660
Patented Apr. 30, 1968

3,380,660
VARIABLE AREA EXHAUST DEFLECTOR
Stanley J. Markowski, East Hartford, Conn., assignor to
United Aircraft Corporation, East Hartford, Conn., a
corporation of Delaware
Filed Apr. 28, 1966, Ser. No. 545,995
7 Claims. (Cl. 239—265.27)

ABSTRACT OF THE DISCLOSURE

A deflection system for an aircraft gas turbine engine wherein a plurality of pivotally mounted deflector segments cooperate to define a vertically directed flow path for jet engine exhaust gases and wherein a movable body cooperates with one or more of the deflector segments to define a discharge area for the deflected gas, the movable body being movable to vary the discharge area after the deflector segments are in the deflecting position.

---

This invention relates to an exhaust configuration for a gas stream. More particularly, this invention relates to a variable area exhaust configuration for a deflected gas stream, especially a deflected gas stream to be used for vertical take off and landing with a gas turbine engine powered aircraft.

Several significant problems are encountered in deflecting the normally axial or horizontal flow from a gas turbine engine in the downward direction for purposes of vertical take off and landing. The avoidance of engine suppression, the maintaining of a high velocity coefficient for the deflected stream, i.e. a high efficiency for the deflected stream, and minimizing the turning losses are among the more important of these problems.

In the present invention the normally horizontal gas flow is directed to a ventral opening in the under side of the engine housing for vertical take off and land. The turning is accomplished through the use of a plurality of articulated inverted U shaped segments which can be positioned to direct the flow from the primary exhaust nozzle to the ventral opening. The segments are stored out of the path of the gas stream exiting from the primary nozzle when deflection is not desired. Changes in engine suppression occur during deflection when engine augmentation, i.e. the energy content of the gas stream, is varied or the direction of the deflected gas stream is changed for purposes of vectoring. The present invention employs a movable body which cooperates with the deflector segments to vary the flow area of the gas stream as it is delivered to the ventral opening. Selective positioning of the movable body to vary flow area overcomes or minimizes engine suppression problems resulting from augmentation or vectoring. The body also serves as a turning guide or vane to reduce turning losses.

In the present invention the primary exhaust nozzle is also driven to the full open position when deflection is desired, and area control is transferred to the movable body. In this way, the engine is not isolated from the deflector, and subsonic flow exists throughout the primary nozzle and deflector thereby reducing turning losses. The full open primary nozzle and the movable body combine to provide a coefficient of nozzle efficiency $C_v$, in the range of .97.

Accordingly, one object of the present invention is to produce a novel configuration for deflecting the exhaust stream of an engine.

Another object of the present invention is to produce a novel deflection configuration for an exhaust stream in which the flow area of the deflected stream is controlled.

Another object of the present invention is to produce a novel deflection configuration for an exhaust stream in which a normally area-controlled primary nozzle is driven to the full open position during deflection, and area control is transferred to the deflection structure.

Other objects and advantages will be apparent from the accompanying drawings and description.

Figure 2:
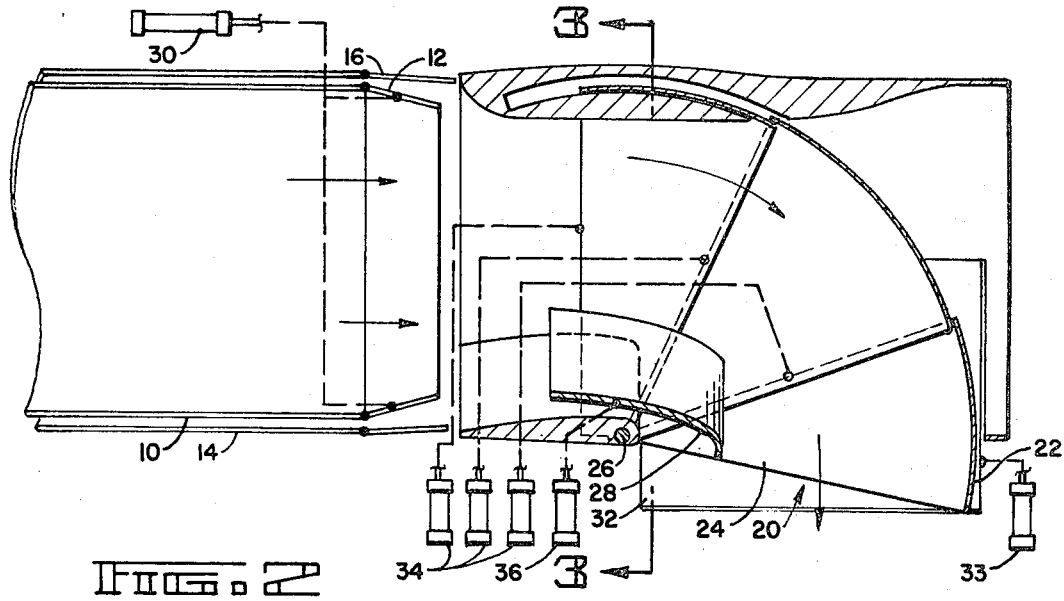
Figure 1:
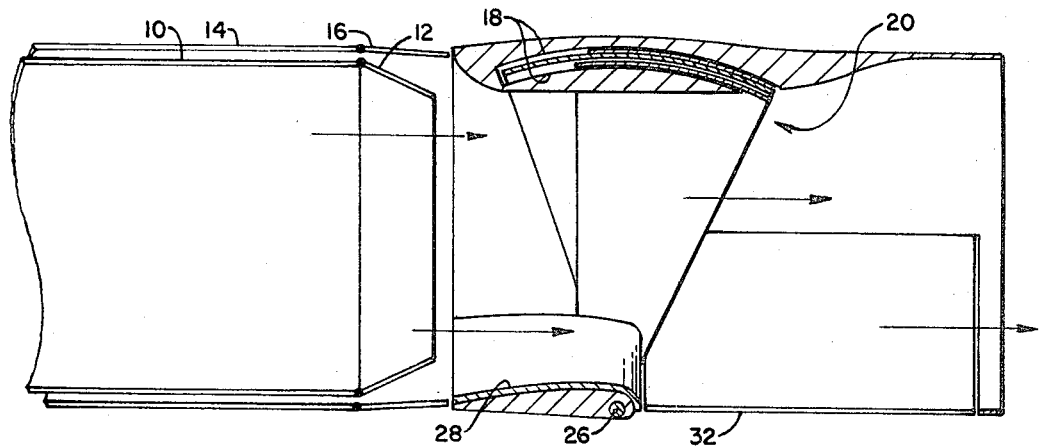
Figure 3:
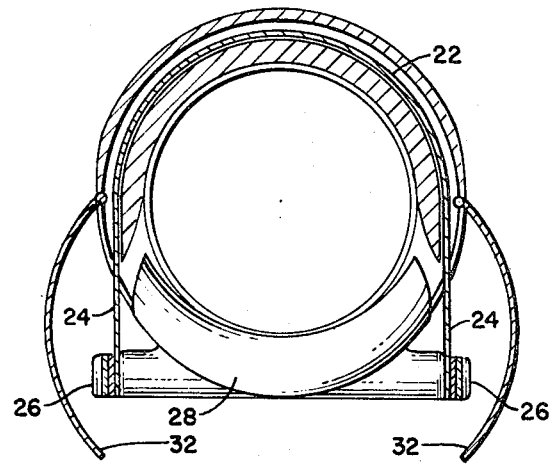
Figure 4:
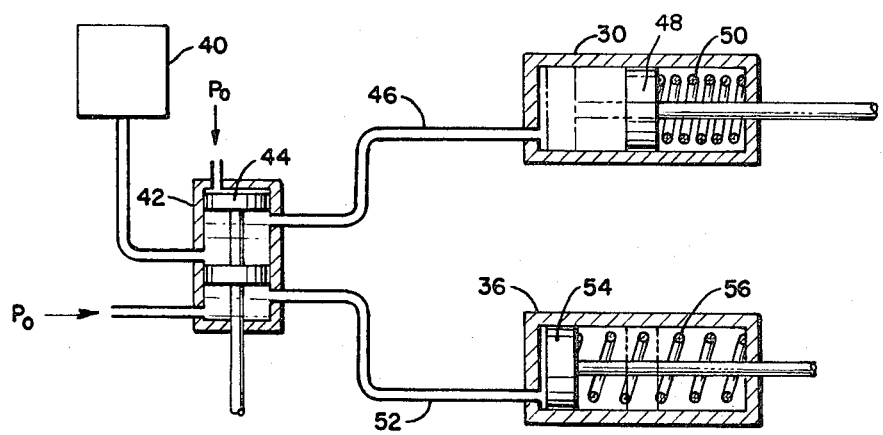

In the drawings:
FIGURE 1 is a sectional elevational view of the aft end of a jet engine incorporating the present invention in the non-deflecting position.
FIGURE 2 is a view similar to FIGURE 1 showing the present invention in the deflecting condition.
FIGURE 3 is a view along line 3—3 of FIGURE 2.
FIGURE 4 is a schematic showing of control structure to be used with the present invention.

Referring now to FIGURE 1, the aft end of a jet engine 10 is shown. Although the details of engine 10 are not shown, engine 10 is of conventional design in which ambient air is drawn into a compressor and delivered in compressed fashion to a burner section where heat is added, the air then being delivered to a turbine section where work is extracted and then being discharged through a primary exhaust nozzle 12. Engine 10 may be either a nonafterburning type of engine or an afterburning type as desired. Ejector type exhaust nozzle structure 14 having blow-in-doors 16 may extend from the aft end of engine 10. Reference is hereby made to U.S. Patent No. 3,057,150 for an example of such ejector and blow-in-door structure. Although the present invention will be described in the environment of ejector and blow-in-door structure, it will be expressly understood that the present invention is not limited to such structure, but rather the present invention may be used with any jet engine.

One section of ejector 14 contains a housing 18 in which is normally located a plurality of deflector segments 20. As can best be seen in FIGURES 2 and 3, each of the deflector segments 20 is substantially U shaped in cross section with an arcuate end portion 22 and pie-shaped side segments 24 extending from a pivot 26 to the arcuate end portion 22. The plurality of segments 20 are articulated, and pivot 26 is a common pivot for all of the segments. As shown in FIGURE 1, the segments 20 are stowed in housing 18, and exhaust gases from engine 10 flow in the direction of the arrows to be discharged rearwardly for normal aircraft flight.

A movable tongue-like body 28 is also present within ejector housing 14, movable body 28 being stowed against ejector 14 and out of the normal gas stream exiting nozzle 12 during normal engine operation.

Nozzle 12 is of the variable area type, and during operation of the engine in normal horizontal flight the position of variable area exhaust nozzle 12 is controlled or regulated in accordance with engine parameters to provide a programmed exhaust nozzle area as a function of selected engine parameters. The control of the area of exhaust nozzle 12 is accomplished by delivering an appropriate control signal to an actuator 30 (shown in FIGURE 2) which is in turn connected to variable area exhaust nozzle 12. The control signal for regulating the area of exhaust nozzle 12 may be derived for example, from a control similar to that shown in U.S. Patent No. 2,987,877. The area control signal is transferred to movable body 28 in the deflection mode of operation.

Referring now to FIGURES 2 and 3, the engine is shown in a vertical deflection mode of operation wherein the normally horizontal exhaust stream is deflected downward for vertical take off and land. A pair of normally closed bomb bay type doors 32 located at the underside of the ejector are driven by an actuator 33 to the open position as shown in FIGURES 2 and 3, the open position of doors 32 providing a ventral opening in the engine. Bomb bay type doors 32 are shown in the normally closed position in FIGURE 1. After bomb bay doors 32 have been opened, a plurality of actuators 34, each of which is connected to an individual deflector segment 20, are activated to drive the several segments 20 to the position shown in FIGURE 2 wherein they combine to form a curved path to turn the gas flow from the normally horizontal direction to a vertical direction as indicated by the arrows.

As discussed above, the turning of the exhaust stream from the normally horizontal direction to the vertical direction gives rise to problems such as varying engine suppression, velocity coefficient of the exhaust stream, and turning losses. To overcome these problems in the present invention, tongue-like movable body 28 is driven by an actuator 36 to the operable position shown in FIGURE 2 where it then cooperates with the deflector segments 20, and especially the most downward deflector segment 20 to define an exhaust area A for the deflected gas stream. The vertical position of the upstream end of movable body 28 in the operable position is selected to be at essentially the same level as the discharge end of fully open nozzle 12 and slightly downstream thereof so that body 12 picks up the exhaust stream before any substantial separation occurs.

Actuator 36 for movable body 12 is adapted to be connected to a control device 40 (see FIGURE 4) that delivers a control signal to exhaust nozzle actuator 30. The control signal is transferable from actuator 30 to actuator 36 so that movable body 28 can be moved fore and aft to variable positions to regulate the exhaust area of the deflected stream in accordance with selected engine parameters. As indicated previously, the movement of movable body 28 to control the area A of the deflected exhaust stream eliminates or at least substantially overcomes the problem of varying engine suppression resulting from deflection or from varying the positions of the segments 20 for vectoring. By proper selection of control parameters the degree of engine suppression at any given time can be monitored, and body 28 can be moved and maintain a constant level of engine suppression. Also, engine augmentation such as by afterburning can be varied as desired, and engine suppression can still be maintained constant by properly positioning movable body 28. The driving of exhaust nozzle 12 to the full open position during deflection results in a subsonic flow in the deflection stream, and the contour of movable body 28 acts as a form of turning vane to reduce or minimize turning losses in the subsonic exhaust stream.

Referring now to FIGURE 4, a schematic control system is shown for transferring area control between primary exhaust nozzle 12 and movable body 28. Control 40 delivers a control signal to a valve housing 42 in which is a spool valve 44 in the position shown in full lines. During nondeflection operation, the control signal is delivered via a conduit 46 to actuator 30 where is positions a piston 48 against the force of a spring 50, piston 48 being connected to exhaust nozzle 12. At the same time, atmospheric pressure $P_o$ is delivered through housing 42 and via a conduit 52 to vent actuator 36 so that a piston 54 connected to body 28 is driven to the full left position by a spring 56. With piston 54 in the full left position, body 28 is stowed as shown in FIGURE 1, and the control signal to actuator 30 regulates exhaust nozzle 12 to define the exhaust area for the exhaust stream.

When deflection of the exhaust stream is desired, spool valve 44 is pulled downward to the position shown in broken lines, so that conduit 46 and actuator 30 are exposed to a $P_o$ vent and the control signal from control 40 is delivered via conduit 52 to actuator 36. The venting of actuator 30 results in piston 48 being driven by spring 50 to the full left position shown in the broken lines corresponding to a full open position for exhaust nozzle 12. At the same time, the control signal delivered to actuator 36 drives piston 54 to the right to the position shown in broken lines, and the signal from control 40 then varies the position of piston 54 to control the position of movable body 28 and hence the area of the deflection stream.

While a preferred embodiment of the present invention has been shown and described, various modifications and substitutions may be made without departing from the spirit and scope of this invention. Accordingly, it is to be understood that this invention has been described by way of illustration rather than limitation.

What is claimed is:

1. A deflection device for a gas stream from an engine including:
    a plurality of deflector segments, said segments being movable between a stored position and deflecting position defining a flow path with a deflected discharge to ambient; and
    means for varying the area of said deflected discharge, said area varying means including a movable body cooperating with at least one of said segments in said deflecting position and actuating means which move to vary the position of said movable body after said deflector segments have attained said deflecting position to define the area of said discharge between said movable body and said one segment in the deflecting position of said segment.

2. A deflection device as in claim 1 wherein said movable body is also movable between a stored position corresponding to said stored position of said segments and an operative position corresponding to said deflecting position.

3. A deflection device as in claim 2 wherein said engine has a primary exhaust nozzle, and including means for controlling the area of said primary nozzle when said movable body is in said stored position, and means for connecting said controlling means to said movable body upon movement of said movable body to said operative position.

4. In a gas turbine engine having an engine housing and a primary exhaust nozzle for the engine exhaust stream, a deflection system including:
    a plurality of deflector segments, said segments being movable between a stored position and a deflecting position;
    a pair of normally closed ventral doors in said engine housing;
    means for opening said ventral doors to define a ventral opening in said engine housing;
    means for moving said deflector segments to said deflecting position, said deflector segments cooperating in said deflecting position to define a flow path for the engine exhaust stream from said primary exhaust nozzle to said ventral opening; and
    means for varying the area of at least part of said flow path to control suppression of said engine during deflection of the engine exhaust stream from said primary exhaust nozzle to said ventral opening, said area varying means including a movable body positioned to cooperate with at least one of said deflector segments to define said area of discharge between said movable body and said one segment, and including actuating means which move to vary the position of said movable body after said deflector segments have attained said deflecting position.

5. A deflection system as in claim 4 wherein said movable body is also movable between a stored position corresponding to said stored position of said segments and said cooperating position.

6. A deflection system as in claim 4 including control means normally controlling the area of said primary exhaust nozzle, and including means for moving said primary exhaust nozzle to a predetermined open position and connecting said control means to said movable body.

7. A deflection system as in claim 6 wherein said predetermined open position of said primary exhaust nozzle is the full open position.

References Cited

UNITED STATES PATENTS

| | | | |
|---|---|---|---|
| 3,087,303 | 4/1963 | Heinze et al. | 239—265.25 |
| 3,115,748 | 12/1963 | Wilde et al. | 60—242 X |
| 3,248,877 | 5/1966 | Alderson et al. | 60—230 X |
| 3,258,206 | 6/1966 | Simonson | 239—265.27 |
| 3,299,638 | 1/1967 | Santamaria et al. | 60—230 X |

FOREIGN PATENTS 25,134  4/1963  Germany.

OTHER REFERENCES

Hagen et al.: German DAS No. 1,119,126. Published in December 1961. Copy in Class 239—265.37.

M. HENSON WOOD, JR., *Primary Examiner.*

VAN C. WILKS, *Assistant Examiner.*